Sept. 19, 1967  J. C. JUREIT  3,342,414
TRACTION PLATE
Filed Sept. 17, 1965
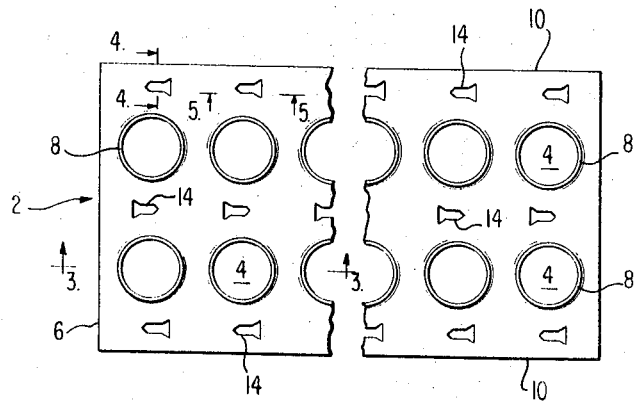
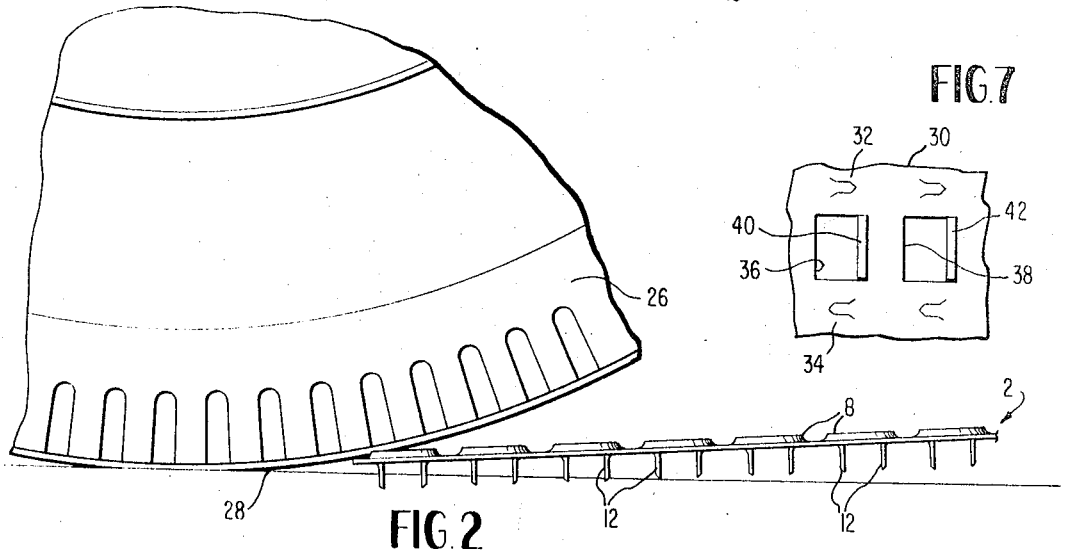
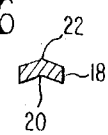
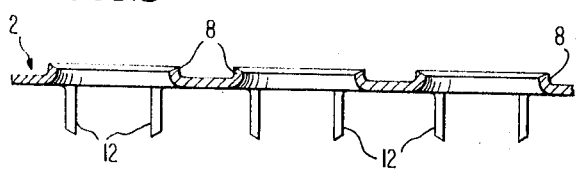
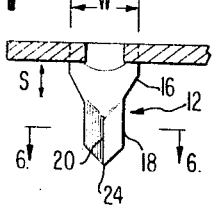
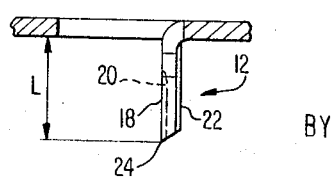
INVENTOR
JOHN C. JUREIT
BY *LeBlanc and Shur*
ATTORNEYS United States Patent Office 3,342,414
Patented Sept. 19, 1967

3,342,414
TRACTION PLATE
John C. Jureit, Miami, Fla., assignor to Automated Building Components, Inc., Miami, Fla., a corporation of Florida
Filed Sept. 17, 1965, Ser. No. 488,204
9 Claims. (Cl. 238—14)

ABSTRACT OF THE DISCLOSURE

The device comprises a traction plate for use by wheeled vehicles in ice or snow to enable such vehicles to start. The traction plate is formed of sheet metal and has a plurality of integral teeth struck downwardly from its lower surface for gripping the road surface and has a plurality of openings struck upwardly to leave upstanding edges extending from the upper surface of the plate for engaging the treads of the tires on the wheeled vehicle to provide traction.

---

This invention relates to vehicle traction plates, and to a method for providing traction for a wheeled vehicle.

It is well known that a motor vehicle is difficult to move or drive away from a curb when the road is covered with ice or snow. The loss of traction for the driving wheels of the vehicle results in their burrowing into the underlying snow or ice, and becoming engaged in the rut resulting from their rotation.

Many attempts have been made to provide a traction device which will work satisfactorily on slippery surfaces. Such attempts have usually resulted in failure, due to a number of reasons. Often these traction plates rely on jagged edges of protuberances, which damage the tire and are dangerous to handle. Traction plates having protuberances which do not destroy the tire, generally do not offer sufficient traction to move the vehicle. Other traction plates are satisfactory on soft surfaces such as snow, mud or sand, but are incapable of securing themselves to a hard icy surface so that the vehicle may be moved. Such traction plates, which cannot grip the icy surface, are merely drawn under the tires as the wheel is driven. Still other traction plates have been too bulky or heavy to be used easily, and, therefore, have not enjoyed commercial success.

Accordingly, it is a primary object of this invention to provide an improved metal traction plate for offering traction to the driving wheels of a vehicle, which is sufficiently light in weight and of such size to be conveniently used. To accomplish this object, the traction plate of this invention has a plurality of integral teeth projecting from one side of the plate for gripping the road surface. A plurality of raised edges project from the other side of the plate to offer traction to the vehicle wheels.

Another object of this invention is to provide an improved traction plate which may be easily carried and stored in the vehicle and which, by placement under the driving wheel of the vehicle, will offer sufficient traction to enable the vehicle to be moved.

Another object of this invention is to provide an improved traction plate which may be used on either soft or hard slippery surfaces to offer traction to the wheels of the vehicle.

A further object of this invention is to provide an improved traction plate which is sufficiently lightweight for convenient use and which may be economically manufactured.

Still another object of this invention is to provide an improved traction plate which does not contain any jagged or rough protuberances that might damage the wheels of a vehicle.

A still further object of this invention is to provide an improved method for providing traction for a wheeled vehicle.

Yet another object of this invention is to provide an improved traction plate which offers traction to the driving wheels of a vehicle without the necessity of raising the wheels of the vehicle to position the plate.

It is another object of the invention to provide an improved traction plate and method of using the same.

The foregoing and other objects and advantages of this invention will become more apparent from a consideration of the following specification, claims, and accompanying drawings wherein:

FIGURE 1 is a partial plan view of the traction plate of this invention;

FIGURE 2 is a vertical sectional view on the longitudinal axis of the traction plate of FIGURE 1, showing the plate positioned adjacent the driving wheel of a vehicle, prior to its movement and use of the plate pursuant to the method of this invention;

FIGURE 3 is an enlarged vertical cross-sectional view taken along lines 3—3 of FIGURE 1;

FIGURE 4 is a vertical cross-sectional view of a portion of a plate taken along lines 4—4 of FIGURE 1;

FIGURE 5 is a vertical cross-sectional view of a portion of a plate taken along lines 5—5 of FIGURE 1 of a single tooth;

FIGURE 6 is a horizontal cross-sectional view of a tooth; and

FIGURE 7 is a plan view of a portion of a traction plate constructed according to another embodiment of the invention.

Referring now to FIGURE 1, there is shown an improved metal traction plate 2 of this invention. The plate 2 has a plurality of equal-diameter openings 4, formed in its body 6 by a punching or stamping operation. The openings 4 are surrounded by upwardly projecting edges or rims 8 which are formed by bending or flaring the metal sheet that forms the body 6, either after or, preferably, in the same operation in which the openings 4 are punched therein. The edges 8 projecting from one face of the plate offer traction to the wheels of a vehicle under which the plate is placed, and extend upwardly above the surface of the plate a distance preferably at least three-fourths of the thickness of the plate.

The openings 4 are formed in two longitudinal rows, each row being spaced in from the sides 10 of the plate approximately one-third of the width of the plate, the distance between the edges or rims 8 of the longitudinally adjacent openings 4 being approximately equal to the length of the radius of the openings 8.

In addition to the openings 4, each traction plate 2 also includes a plurality of integral teeth 12 projecting from the opposite face of the plate than edges or rims 8. The teeth 12 are formed in a manner presently to be described and provide completely adequate gripping in the surface over which the plate is placed, and prevent the plate from moving as the driving wheels of the vehicle are rotated. All of the teeth are substantially identical and are punched or struck from the body 6 in three longitudinal rows, thus leaving a like number of rows of slots 14 in the body. The two outermost rows of slots and teeth are positioned approximately equidistantly between the two rows of of openings 4. The teeth in the two outermost rows are punched or struck from the body 6 so that all the teeth face in one direction, whereas the teeth in the center row are punched or struck from the body so that they face in the opposite direction.

Referring now to FIGURES 4 and 5, each of the teeth 12 includes a generally triangular-shaped shoulder 16 and a shank portion 18. As shown in FIGURE 6, the shank portion 18 is generally V-shaped in cross section and has a concave punch face 20 and a convex back face 22. In order for the teeth to grip the road surface, the teeth shanks terminate in pointed ends, which are shown in FIGURES 4 and 5 as chisel-pointed ends 24. While other types of pointed ends may be utilized, such as scarf-pointed ends or rounded points, the chisel points are preferred.

In a preferred illustrative embodiment of this invention, the plates 2 are made from 14-gauge galvanized mild steel plate and have a length of approximately 18 inches, a width of approximately 6 inches, and a thickness of approximately 0.075 inch. The diameter of each of the openings 4 is approximately 13/16 inch and the edges project approximately 1/16 inch upward from the plate surface. The openings 4 and teeth 12 are arranged and spaced such that there are ten openings and teeth per row per foot of plate. The length L (as seen in FIGURE 5) of each tooth 12 is approximately 3/8 of an inch—or approximately six times the distance said rims project above the plate. The shank portion 18 of the teeth has a width of approximately 1/8 inch. The width W (as seen in FIGURE 4) of the shoulders is approximately 1/4 inch and the length S of the shoulders is approximately 3/16 inch. Thus approximately one half of the tooth length L is of a generally fixed width, while approximately one half of the tooth length L is in the shoulder and of a greater width and generally triangular. Hence the ratio of tooth length of generally fixed width is approximately equal to the tooth length of broadening width. With a tooth length of 3/8 of an inch, each tooth has a length L equal to five times the plate thickness. This ratio preferably should not exceed approximately 5.5 times the plate thickness with a 14-gauge plate, in order to prevent bending of the teeth when the teeth engage a hard surface.

The combination of terminal tooth portions of substantially constant width (generally or substantially parallel sides) with the generally triangular portion at the tooth base and a chisel or rounded point, has been found highly effective under widely varying conditions. In a preferred embodiment the included angle in the chisel point may be 90° and preferably should not exceed this amount. The terminal portions of the teeth penetrate ice readily and do not suffer the point blunting and bending which occurs with teeth of a totally triangular shape, wherein the points tend to be so sharp as to be somewhat delicate. Further, the preferred tooth shape of the invention is such that the generally-parallel-sided end portion chops its way into ice in the manner of an ice pick, permitting the triangular shoulder portion to enter easily and provide greater bearing surface than the thinner ends alone would provide.

In the aforementioned specific embodiment, the openings 4 are 13/16 inch, or approximately eleven times the thickness of 14-gauge galvanized plate. This provides an opening large enough to permit entry of entire tire treads in most instances, thereby providing considerably greater traction than is available where this is not the case. As a consequence, it is generally preferable that the opening diameter should be approximately eight or more times plate thickness and preferably approximately eleven times plate thickness.

Referring to FIGURES 2 and 3, the traction plate is used by positioning it as far under a rear tire or driving wheel 26 as possible without raising the tire from the road surface 28. There is no necessity that teeth 12 grip the road surface prior to the movement of the vehicle. Upon the slightest movement forward of the tire 26, the weight of the vehicle causes the teeth nearest the tire to dig into the slippery surface. The teeth 12 are sufficiently long that they may effectively extend into a soft, relatively frictionless surface such as snow or sand, far enough to secure the plate. Over a hard icy surface, the teeth will also penetrate the ice under the weight of the vehicle and secure the plate. As the vehicle moves forward, its weight causes successive transverse lines of teeth 12 to grip the slippery surface. Considering the method of use more specifically, the wheel consecutively drives a generally uniform cross-section portion of a transverse line of teeth into the surface and then drives the shoulders home. The thickness of the plate is such (preferably 16-gauge or heavier) that as one line of teeth is driven in directly beneath the weight of the wheel, the uniform cross-section portion of the next line of teeth is already entering. At the same time, the tire surface is not only engaging the upraised rims 8 but tire treads are also entering the holes 4 for additional, more positive traction.

The holes 4 are sufficiently large in diameter to significantly reduce the weight of the traction plate and yet offer adequate traction. The plate is sufficiently compact so it may be readily stored in the trunk, or elsewhere on the vehicle, and used when necessary. While one plate will often provide traction over a sufficient distance to enable a vehicle to move, an additional plate may be placed end-to-end to provide a greater path of travel for the vehicle.

As seen best in FIGURE 3, the edges 8 are smooth and free from protuberances, jagged edges, or irregularities. Thus there is no danger of piercing or damaging the tires of a vehicle while the plate offers traction. Even if the upper surface of the plate becomes completely covered with caked ice or snow, traction will still be offered by the entering of the tire in the openings 4, to enable the movement of the vehicle. These openings are sufficiently large that it is very unlikely they will become completely filled or caked with ice.

While the openings from which the upwardly extending edges are bent are shown as round, it is to be understood that other-shaped openings may be used and that the upwardly extending edges need not extend around the entire periphery of the opening as in the illustrated preferred embodiment of the invention. For example, the openings may be rectangular in nature, and one such embodiment of the invention is shown in FIGURE 7. Referring to that figure, there is seen a portion 30 of a plate constructed according to another embodiment of the invention. Located between rows of teeth 32 and 34 are rectangular openings 36 and 38 which have edges 40 and 42 struck upwardly therefrom to engage and grip a tire rolling thereon. Still other shaped openings are also possible, as will be apparent to those skilled in the art.

It will be apparent from the foregoing that the metal traction plate of this invention is economical to manufacture and sufficiently light in weight to be used quickly and conveniently by motorists. Moreover, this plate, by virtue of its upstanding edges and downwardly extending, nail-like teeth, offers traction over hard or soft slippery surfaces.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A traction plate for a wheeled vehicle having tire treads comprising a sheetmetal plate having rows of teeth struck therefrom and extending substantially perpendicular to one surface of said plate, and having openings struck therein to leave upstanding edges extending from the opposite surface of said plate for engagement with said tires and the treads thereof, said openings being large enough to receive a tread for positive locking of the base of the tread against the inner edge of said rim, said teeth comprising generally triangular bases with the wide base of said triangle attached to the plate, the apexes of the triangles terminating in tooth shanks which extend along the altitude of the triangle, the cross-sectional shape and size of said shanks being substantially uniform over their entire length, said shanks terminating in points which are symmetrically shaped to avoid bending stresses on said teeth, said shanks being generally arcuate in cross-sectional shape.

2. A traction plate as set out in claim 1 wherein said teeth have a length of no greater than approximately 5.5 times the thickness of the plate and the length of the triangular and shank portions of the teeth are approximately equal.

3. A traction plate as set out in claim 2 wherein the openings are of a minimum dimension equal to at least eight times the thickness of said plate.

4. A traction plate as set out in claim 3 wherein said plate is oblong in shape and carries at least two spaced, substantially parallel rows of openings extending substantially parallel to the long axis of the plate, and at least three spaced, substantially parallel rows of teeth struck to leave three rows of slots, said rows of teeth being alternated with said rows of openings and substantially parallel thereto, alternate rows of teeth being struck in opposite directions so that the concave surfaces formed by the arcuate shanks in one row face in opposite directions from the concave surfaces of the shanks in adjacent rows, said teeth having chisel points.

5. A traction plate as set out in claim 4 wherein the maximum width of the triangular portion of the teeth is approximately twice the width of the shanks of the teeth and the included angle in said chisel point is no less than approximately 90°.

6. A traction plate for a wheeled vehicle having tire treads comprising a sheet metal plate having a plurality of teeth struck therefrom and extending substantially perpendicular to one surface of said plate for gripping a road surface, said teeth comprising, tooth shanks having a cross section which is generally arcuate and substantially uniform over its length and terminating in pointed ends distal of the plate, and attached to the plate by generally triangular bases of a size expanded from that of the cross section of the shank, said plate having openings struck therein to leave upstanding edges extending from the opposite surface of said plate for engagement with said tires and the treads thereof, said openings being large enough to receive a tread for positive locking of the base of the tread against the inner edge of said edge.

7. The traction plate of claim 6 in which said openings are circular and have a diameter which is at least eight times greater than the thickness of said body.

8. The traction plate of claim 6 in which said openings and said teeth are arranged in alternate rows parallel to the longitudinal axis of said body.

9. The traction plate of claim 8 in which said raised edges project from said body a distance equal to at least approximately three-fourths of the thickness of said body.

References Cited

UNITED STATES PATENTS

| | | | |
|---|---|---|---|
| 2,486,911 | 11/1949 | Becker | 238—14 |
| 2,975,977 | 3/1961 | Chadacki et al. | 238—14 |
| 3,016,586 | 1/1962 | Atkins | 85—11 |
| 3,234,841 | 2/1966 | Adams | 85—13 |

ARTHUR L. LA POINT, *Primary Examiner.*

R. A. BERTSCH, *Assistant Examiner.*